United States Patent
Treloar et al.

(10) Patent No.: US 11,568,291 B2
(45) Date of Patent: Jan. 31, 2023

(54) PETROLEUM PLAY ANALYSIS AND DISPLAY

(71) Applicant: Landmark Graphics Corporation, Houston, TX (US)

(72) Inventors: Michael Charles Quintrell Treloar, Didcot (GB); Owen Edward Sutcliffe, Steventon (GB); Daniel James David Slidel, Tilehurst (GB)

(73) Assignee: Landmark Graphics Corporation, Houston, TX (US)

( * ) Notice: Subject to any disclaimer, the term of this patent is extended or adjusted under 35 U.S.C. 154(b) by 357 days.

(21) Appl. No.: 16/864,958

(22) Filed: May 1, 2020

(65) Prior Publication Data
US 2021/0342724 A1 Nov. 4, 2021

(51) Int. Cl.
*E21B 49/00* (2006.01)
*G01V 99/00* (2009.01)
(Continued)

(52) U.S. Cl.
CPC ............ *G06N 7/005* (2013.01); *E21B 49/00* (2013.01); *G01V 99/005* (2013.01); *G06Q 10/087* (2013.01)

(58) Field of Classification Search
None
See application file for complete search history.

(56) References Cited

U.S. PATENT DOCUMENTS

| 7,467,044 | B2 | 12/2008 | Tran et al. | |
| 2011/0264430 | A1* | 10/2011 | Tapscott | G01V 99/00 703/10 |
| 2013/0064040 | A1* | 3/2013 | Imhof | G01V 1/302 367/73 |

(Continued)

FOREIGN PATENT DOCUMENTS

| EP | 3627410 | 3/2020 |
| GB | 2491715 | 12/2012 |

(Continued)

OTHER PUBLICATIONS

Neber et al., Systematic Evaluation of Unconventional Resource Plays Using a New Play-Based Exploration Methodology, Oct. 22-24, 2012, Society of Petroleum Engineers, SPE Asia Pacific Oil and Gas Conference and Exhibition (Year: 2012).*

(Continued)

*Primary Examiner* — Brent A. Fairbanks
(74) *Attorney, Agent, or Firm* — Kilpatrick Townsend & Stockton LLP

(57) ABSTRACT

A system for analysis and display of hydrocarbon play information according to some aspects determines a probability of source rock occurrence according to source rock age based on a proven play concept. The system can also determine a relative probability of migration for hydrocarbons from a source rock of a proposed petroleum play concept to a reservoir. A relative probability of wellbore success for the proposed play concept can be determined at least in part based on these probabilities. The system can (Continued)

display the relative probability of wellbore success for the proposed play concept, either alone as part of a displayed inventory of proposed hydrocarbon play concepts. The system can produce accurate results that facilitate rapid play concept investigations for hydrocarbon exploration.

20 Claims, 10 Drawing Sheets

(51) Int. Cl.
  *G06N 7/00* (2006.01)
  *G06Q 10/08* (2012.01)

(56) References Cited

U.S. PATENT DOCUMENTS

| | | |
|---|---|---|
| 2015/0254567 A1 | 9/2015 | Imhof |
| 2015/0371345 A1 | 12/2015 | Jeffers |
| 2020/0123883 A1 | 4/2020 | Kayum et al. |
| 2021/0123343 A1* | 4/2021 | Zhou .................. G06Q 10/0639 |

FOREIGN PATENT DOCUMENTS

| | | |
|---|---|---|
| WO | 2010082969 | 7/2010 |
| WO | 2014159479 | 10/2014 |

OTHER PUBLICATIONS

Klemme et al., "Effects Petroleum Source Rocks of the World: Stratigraphic Distribution and Controlling Depositional Factors", pp. 43, 1991.
Otis et al., "A Process for Evaluating Exploration Prospects", The American Association of Petroleum Geologists, pp. 32, Jul. 1997.
Wang et al., "Dependent Risk Calculations in Multiple-Prospect Exploration Evaluations", SPE International, 2000, pp. 14.
White, "Geologic Risking Guide for Prospects and Plays", The American Association of Petroleum Geologists 1993, pp. 14.
GB Application GB2100895.8, "Combined Search and Examination Report", dated Jul. 5, 2021, 5 pages.
PCT Application No. PCT/US2020/031107, International Search Report and Written Opinion, dated Jan. 29, 2021, 10 pages.

* cited by examiner

PETROLEUM PLAY ANALYSIS AND DISPLAY

TECHNICAL FIELD

The present disclosure relates generally to hydrocarbon exploration. More specifically, but not by way of limitation, this disclosure relates to determining and outputting data of the probability of wellbore success for unproven hydrocarbon plays.

BACKGROUND

A hydrocarbon play can include a group of fields or prospective fields in the same geographic region that are controlled by the same or similar set of geological circumstances. A play concept can be the combination of system elements that characterize a particular play. Geoscientists are routinely tasked with evaluating play concepts that have the potential to yield viable plays defining areas for the future placement of hydrocarbon wellbores. A relatively simplistic evaluation can yield valuable forecasts when the play concept is based on reservoirs and source rocks that do not vary much in age. However, when reservoirs and source rocks of different ages are known to exist in a region of interest and need to be considered, evaluation becomes more difficult, sometimes leading to arbitrary assignment of probabilities of viability to expedite decisions.

DETAILED DESCRIPTION

Certain aspects and features of the present disclosure relate to analyzing and determining a probability of success for wellbores positioned in geologic regions characterized by unproven hydrocarbon play concepts. The system can use statistical methods to determine probabilities of success that take into account plays being charged from the most prolific source rocks as well as plays with varying differences in age between source rock and between potential hydrocarbon reservoirs. The system can use an interactive empirical database of proven play concepts. The proven play concepts may come from public information stored as files that include vectorized content that represents formation cross-sections (e.g., geological formation layer indications) of a proven hydrocarbon play.

In some aspects, the system uses information from the interactive empirical database of proven hydrocarbon play concepts to determine a probability distribution by age of rock sources in a proven play concept and a relative migration probability for hydrocarbons from source rock in an age interval of a proposed play concept. Probabilities are statistically combined to calculate a relative probability of wellbore success for a play concept under consideration. The system and automated processes described herein can produce accurate results that facilitate rapid play concept investigations for hydrocarbon exploration.

In some examples, a system can determine a probability of source rock occurrence according to source rock age in a proven hydrocarbon play concept. The system can also determine a relative probability of migration for hydrocarbons from a source rock in an age interval of a proven hydrocarbon play to a reservoir by comparing a normalized age distribution of proven reservoirs to information regarding proposed reservoirs in the age interval of the proposed hydrocarbon play concept. The system can also calculate a relative probability of success for the proposed play concept by combining the probability of source rock occurrence and the relative probability of migration, and display the relative probability of success for the proposed hydrocarbon play concept.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
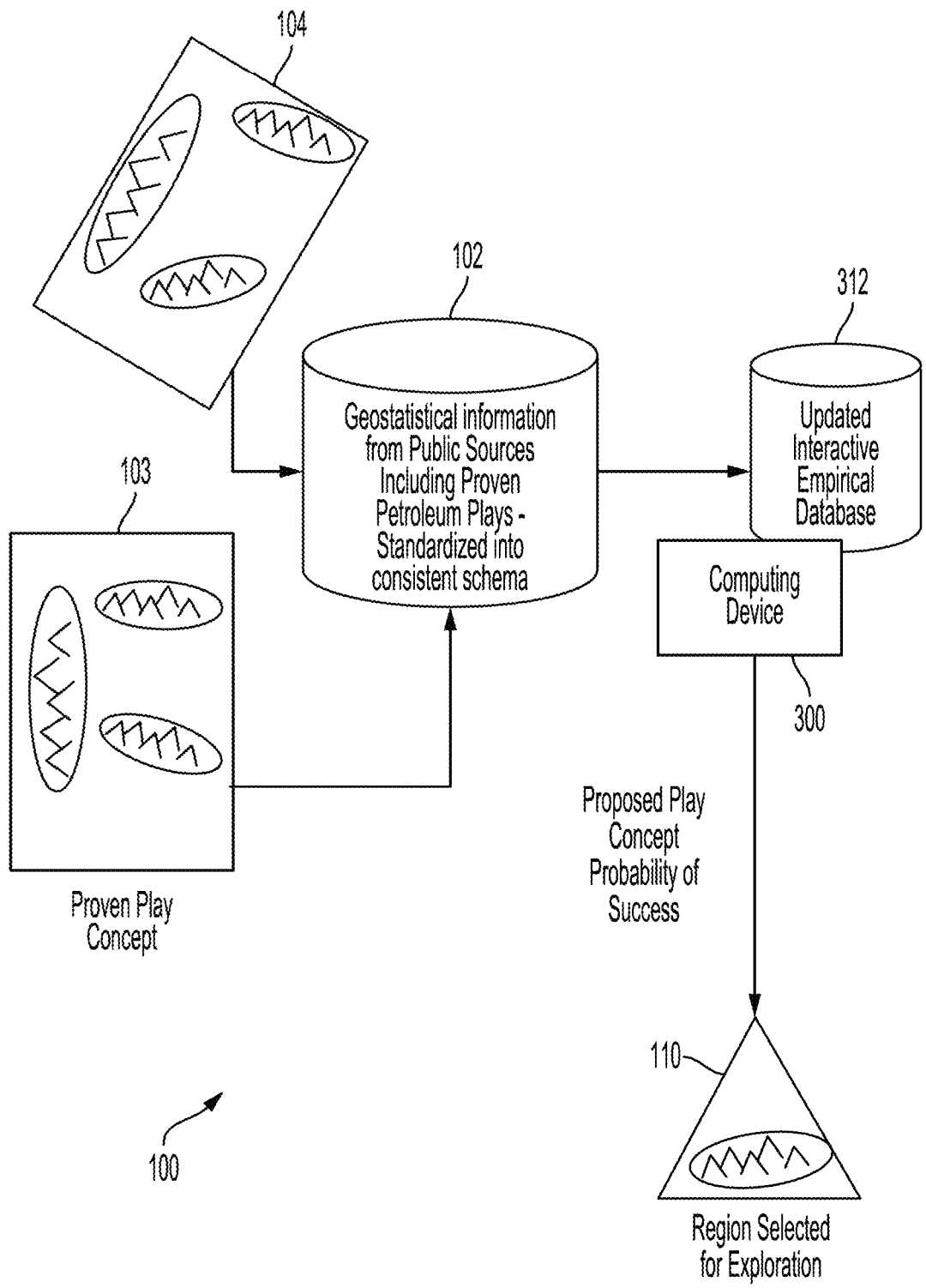
FIG. 1 is a block diagram depicting a system for executing a petroleum play analysis according to some aspects of the disclosure.

FIG. 1 is a schematic block diagram depicting a system 100 for carrying out petroleum play analysis according to some aspects of the disclosure. FIG. 1 and other examples herein may be presented in the context of petroleum plays. However, the techniques described can be applied to plays that include, or are directed to, natural gas or other types of hydrocarbon deposits. System 100 includes information 102 from public geological databases as well as published papers and reports. This information describes proven petroleum plays, regions where successful wells have been formed in the past. Proven petroleum plays are described in unstructured documents that can be stored as unstructured files. Documents 103 and 104 can include proven play concepts and information about these plays can be stored across numerous documents. In order to be used in the evaluation of proposed play concepts, information 102 is stored as a database where the geological data from the publicly available documents is standardized into a consistent schema. This database may contain a globally representative sample of the world's proven lay concepts. The information 102 can be compiled to be globally extensive and to be spatially and stratigraphically enabled, resulting in interactive empirical database 312. Database 312 includes documents describing proven petroleum play concepts that can be derived from information 102 and can be updated regularly or continuously as additions are made to information 102. Interactive empirical database 312 is accessed by computing device 300, which can calculate and display the relative probability of wellbore success for proposed play concepts. The relative probability can be used to select regions for exploration, such as region 110. Computing device 300 can use the geological parameters of unproven play concepts to assess the relationships in empirical database 312.

Figure 2:
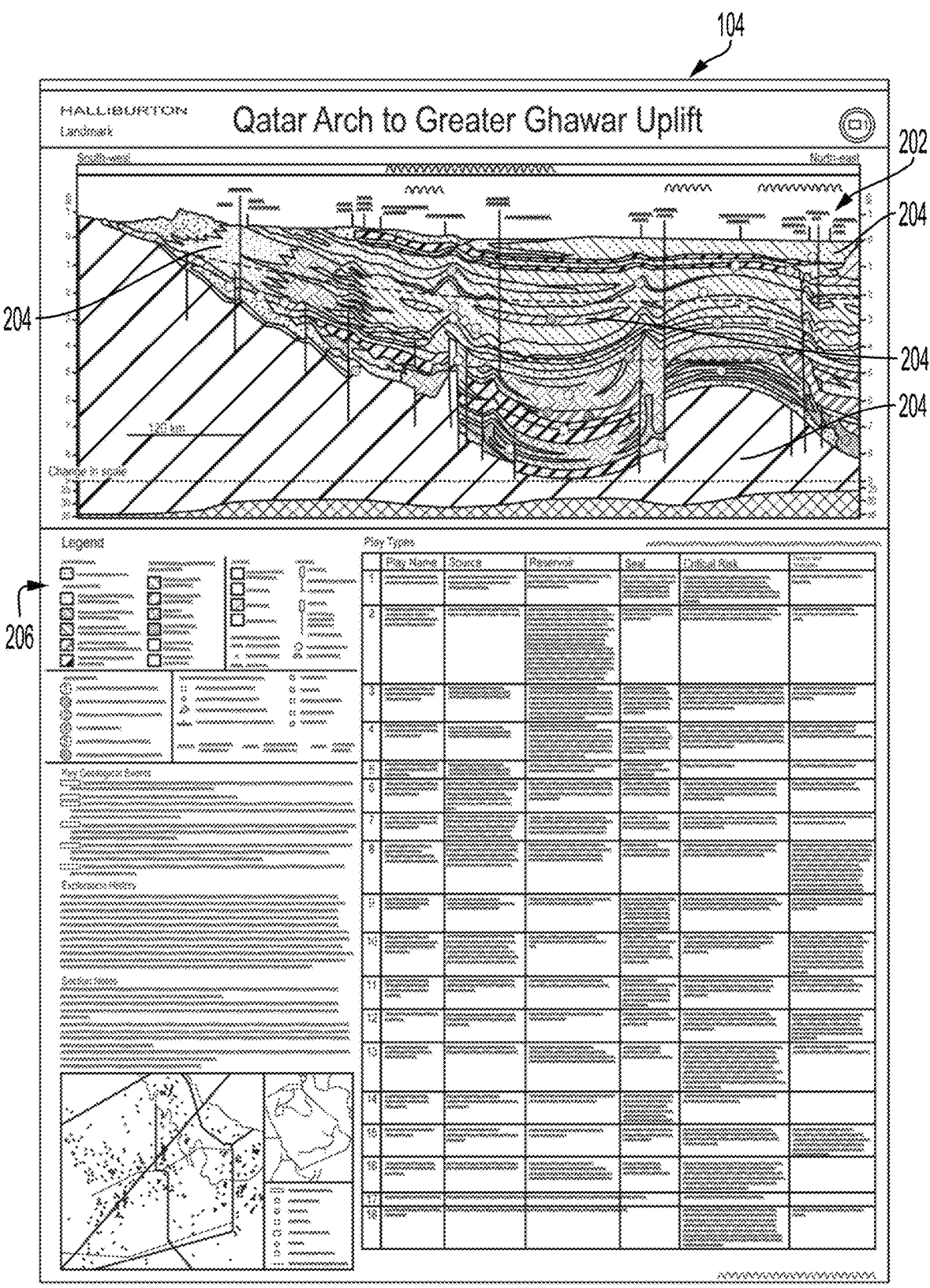
FIG. 2 is an example of an unstructured document used to generate an interactive empirical database according to some aspects of the present disclosure.

FIG. 2 is an example of the unstructured document 104 used to generate the information 102 according to one example of the present disclosure. The unstructured file of the document provides information that can be stored in the empirical database 312. As described above with respect to FIG. 1, the unstructured document 104 may include an area of interest 202. The area of interest 202 may include an area of the unstructured document 104 that includes an image. As illustrated, the area of interest 202 represents a play cross-section of a geological basin. Other examples of the area of interest 202 may include chronostratigraphic charts. As illustrated, various facies types are depicted by polygons 204. Each of the polygons 204 may include a different color or pattern, as indicated in a legend 206 (i.e., the document property information 106 of FIG. 1). The varying colors are patterns that may represent varying formation properties associated with the portions of the formation represented by the polygons 204.

Figure 3:
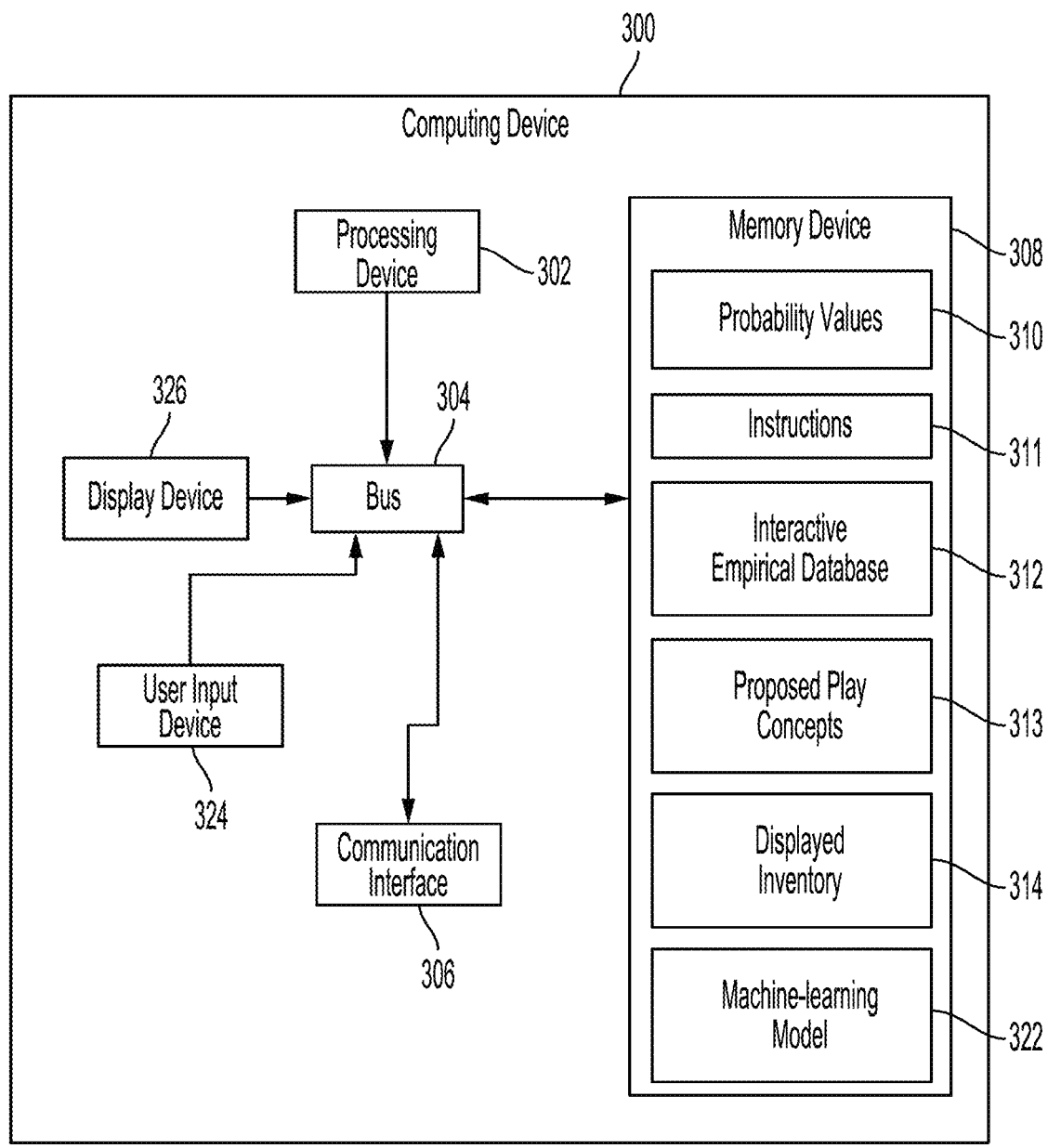
FIG. 3 is a block diagram depicting a computing device for executing hydrocarbon play analysis according to some aspects of the disclosure.

FIG. 3 depicts an example of the computing device 300 according to one example. The computing device 300 can include a processing device 302, a bus 304, a communication interface 306, a non-transitory or non-volatile memory device 308, a user input device 324, and a display device 326. In some examples, some or all of the components shown in FIG. 3 can be integrated into a single structure, such as a single housing. In other examples, some or all of the components shown in FIG. 3 can be distributed (e.g., in separate housings) and in communication with each other.

The processing device 302 can execute one or more operations for providing hydrocarbon play analysis. The processing device 302 can execute instructions 311 stored in the memory device 308 that are executable by the processing device 302 to perform the operations. The processing device 302 can include one processing device or multiple processing devices. Non-limiting examples of the processing device 302 include a Field-Programmable Gate Array ("FPGA"), an application-specific integrated circuit ("ASIC"), a microprocessing device, etc.

The processing device 302 can be communicatively coupled to the memory device 308 via the bus 304. The non-volatile memory device 308 may include any type of memory device that retains stored information when powered off. Non-limiting examples of the memory device 308 include electrically erasable and programmable read-only memory ("EEPROM"), flash memory, or any other type of non-volatile memory. In some examples, at least some of the memory device 308 can include a non-transitory medium from which the processing device 302 can read instructions. A non-transitory computer-readable medium can include electronic, optical, magnetic, or other storage devices capable of providing the processing device 302 with computer-readable instructions or other program code. Non-limiting examples of a computer-readable medium include (but are not limited to) magnetic disk(s), memory chip(s), read-only memory (ROM), random-access memory ("RAM"), an ASIC, a configured processing device, optical storage, or any other medium from which a computer processing device can read instructions. The instructions can include processing device-specific instructions generated by a compiler or an interpreter from code written in any suitable computer-programming language, including, for example, C, C++, C#, etc.

In some examples, the memory device 308 can include probability values 310, for both final calculated probabilities of success and entrapment, as well as intermediate probability values used during calculations. In some examples, the computer program instructions 311 determine probabilities for hydrocarbons migrating from proposed rock sources to proposed reservoirs of various ages and statistically combine probabilities to calculate relative probabilities of wellbore success. The memory device 308 can also include the interactive empirical database 312, with information gathered one or more public geological databases as well as published papers and reports. The memory device 308 can include stored proposed play concepts 313, which can be drawn upon to produce a displayed inventory 314 of play concepts with calculated probabilities. The memory device 308 can also include a machine-learning model 322.

In some examples, the computing device 300 includes a communication interface 306. The communication interface 306 can represent one or more components that facilitate a network connection or otherwise facilitate communication between electronic devices. Examples include, but are not limited to, wired interfaces such as Ethernet, USB, IEEE 1394, and/or wireless interfaces such as IEEE 802.11. Bluetooth, near-field communication (NFC) interfaces, RFID interfaces, or radio interfaces for accessing cellular telephone networks (e.g., transceiver/antenna for accessing a CDMA, GSM, UMTS, or other mobile communications network). The interactive empirical database 312 can reside remotely or in a cloud-based storage system, in which case the database would be accessed over the communication interface connected to a network.

In some examples, the computing device 300 includes a user input device 324. The user input device 324 can represent one or more components used to input data. Examples of the user input device 324 can include a keyboard, mouse, touchpad, button, or touch-screen display, etc. The user input device can be used to initiate calculations and provide input regarding how statistical probabilities and other information is displayed. In some examples, the computing device 300 includes a display device 326, which can display play analysis information including the probability of success for a proposed play concept or an inventory of proposed play concepts. The display device 326 can represent one or more components used to output data. Examples of the display device 326 can include a liquid-crystal display (LCD), a television, a computer monitor, a touch-screen display, etc. In some examples, the user input device 324 and the display device 326 can be a single device, such as a touch-screen display.

In some examples, the interactive empirical database 312 is compiled to be globally extensive and to be spatially and stratigraphically enabled. The information in the database is leveraged to calculate the relative probability that a proposed and unproven play concept is geologically viable. This assessment is based on data including the age of the proposed source rocks and the difference in age between the proposed source rocks and the proposed reservoir. The data used in the database can be gathered so that age-distribution of source rocks in proven plays is heterogeneous and represents a global assessment of the age relationship between proven intervals of source rocks and the reservoirs that the source rocks charge.

While the database in the example discussed above is global, a regional database could instead be used. Such a regional database would be based on information gathered from regional datasets. The results obtained based on regional data may be less accurate than those obtained using global data, but could nevertheless be useful.

Figure 4:
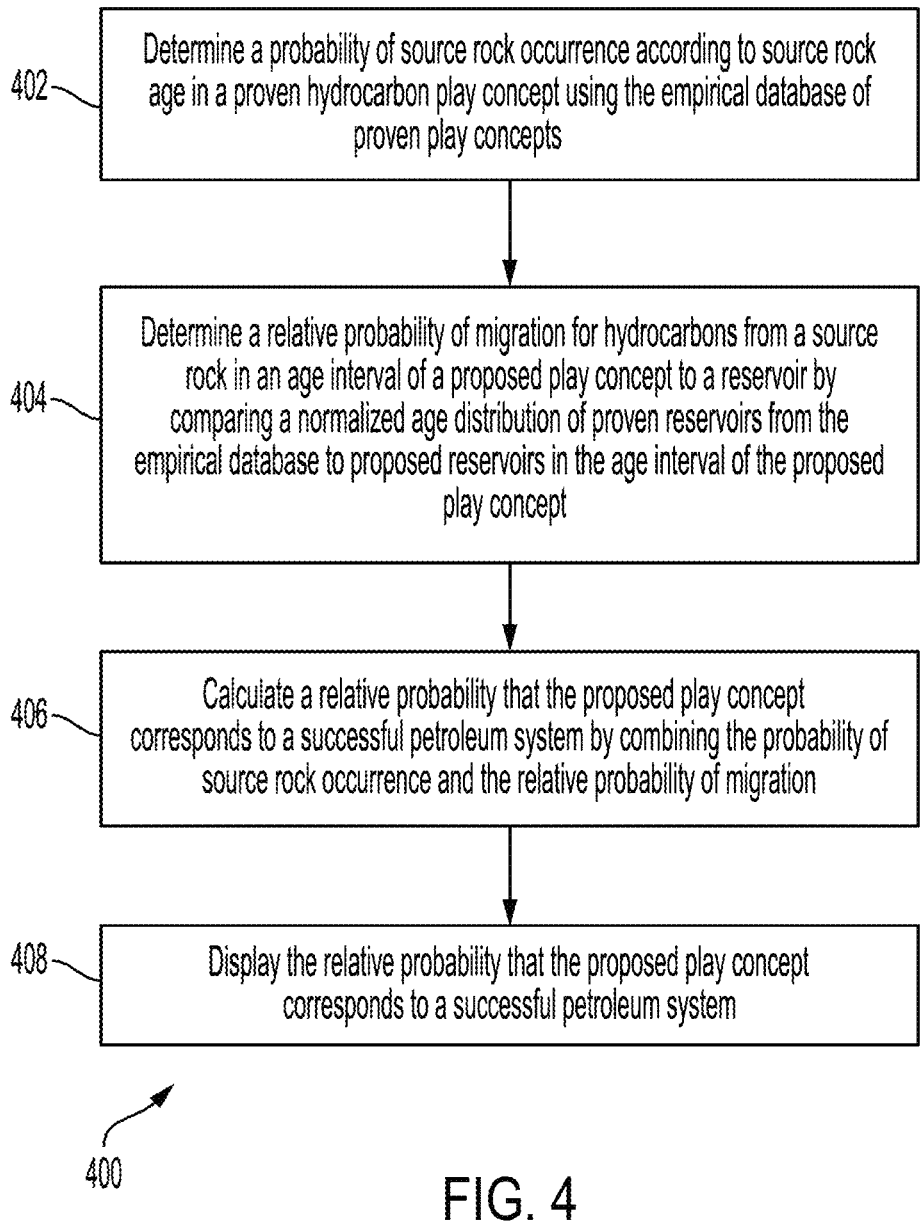
FIG. 4 is a flowchart illustrating a process for hydrocarbon play analysis according to some aspects of the disclosure.

FIG. 4 is a flowchart showing a process 400 for determining a production probability of an unproven hydrocarbon play. In this example, process 400 is carried out by computing device 300 of FIG. 3. Process 400 makes use of the globally consistent, interactive empirical database 312 of proven play concepts.

At block 402 of process 400, processing device 302 determines a probability of source rock occurrence according to source rock age in a proven hydrocarbon play concept using the empirical database 312. At block 404, processing device 302 determines a relative probability of migration for hydrocarbons from a source rock in an age interval of a proven hydrocarbon play to a reservoir by comparing a normalized age distribution of proven reservoirs from the empirical database 312 to proposed reservoirs in the age interval of the proposed play concept. At block 406, processing device 302 calculates a relative probability of success for the proposed play concept by combining the probability of source rock occurrence and the relative probability of migration as determined above. At block 408, computing device 300 displays the relative probability of success for the proposed play concept. The relative probability of success can be used to determine an area in which to drill a wellbore.

Figure 5:
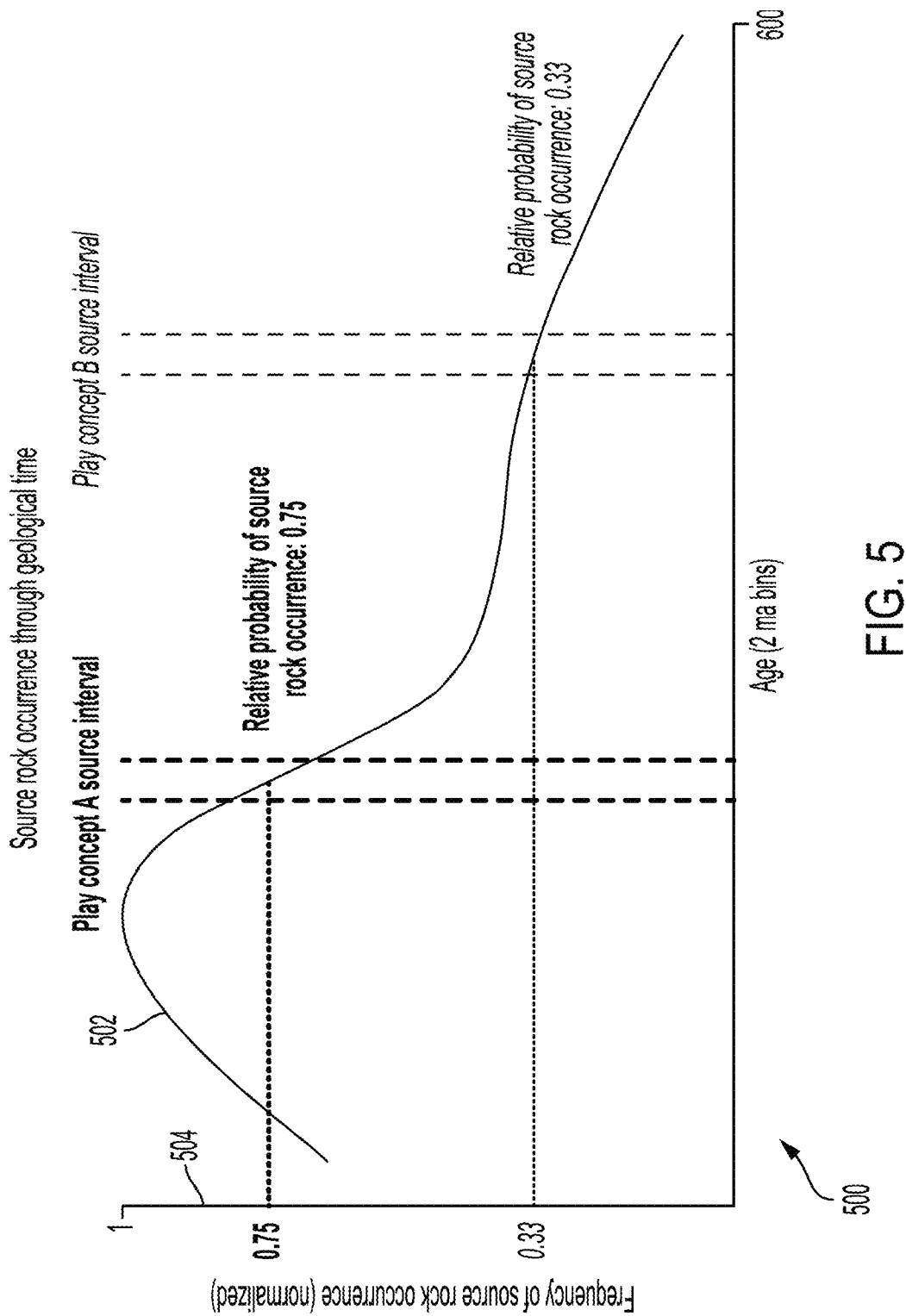
FIG. 5 is a graph showing a source rock frequency distribution used in petroleum play analysis according to some aspects of the disclosure.

The empirical database is a compilation of data from the hydrocarbon system elements that are present within the world's proven hydrocarbon systems. This compilation records the geographic location of the hydrocarbon systems, the geological age of proven system elements, including the reservoirs and the source rocks, and the age relationships between the source rocks and reservoirs in proven hydrocarbon systems. Using the empirical database of plays, the geological age of a proposed source rock for an unproven play concept can be compared against the known distribution of proven source rocks. A model for relative probability can then be derived from this known population or proven sources as shown in FIG. 5. In instances where the source rock is already proven, the relative probability value is 1.

FIG. 5 depicts a graph 500 of data as processed during a petroleum play analysis according to some aspects of the disclosure. Graph 500 includes a frequency curve 502 for a source rock of a particular age contributing to valid play concepts. This distribution is normalized to the highest value in the entire population of plays so that the highest frequency is 1 as shown on vertical axis 504. Two potential source rock age intervals, A and B, are shown and the relative probability that an unproven source rock could contribute to a valid petroleum system is revealed by frequency curve 502. The relative probability is given by the intersection of the curve with the center of each interval.

Once the age distributions have been determined, as shown above, the age distribution of reservoirs charged by source rocks of a particular age is then assessed from the database. The relative probability that hydrocarbons derived from the proposed source rock could migrate to the proposed reservoir of a particular age is then calculated. This relative probability of charge to a reservoir from a source rock of a given age can be referred to as the relative migration probability.

Figure 6:
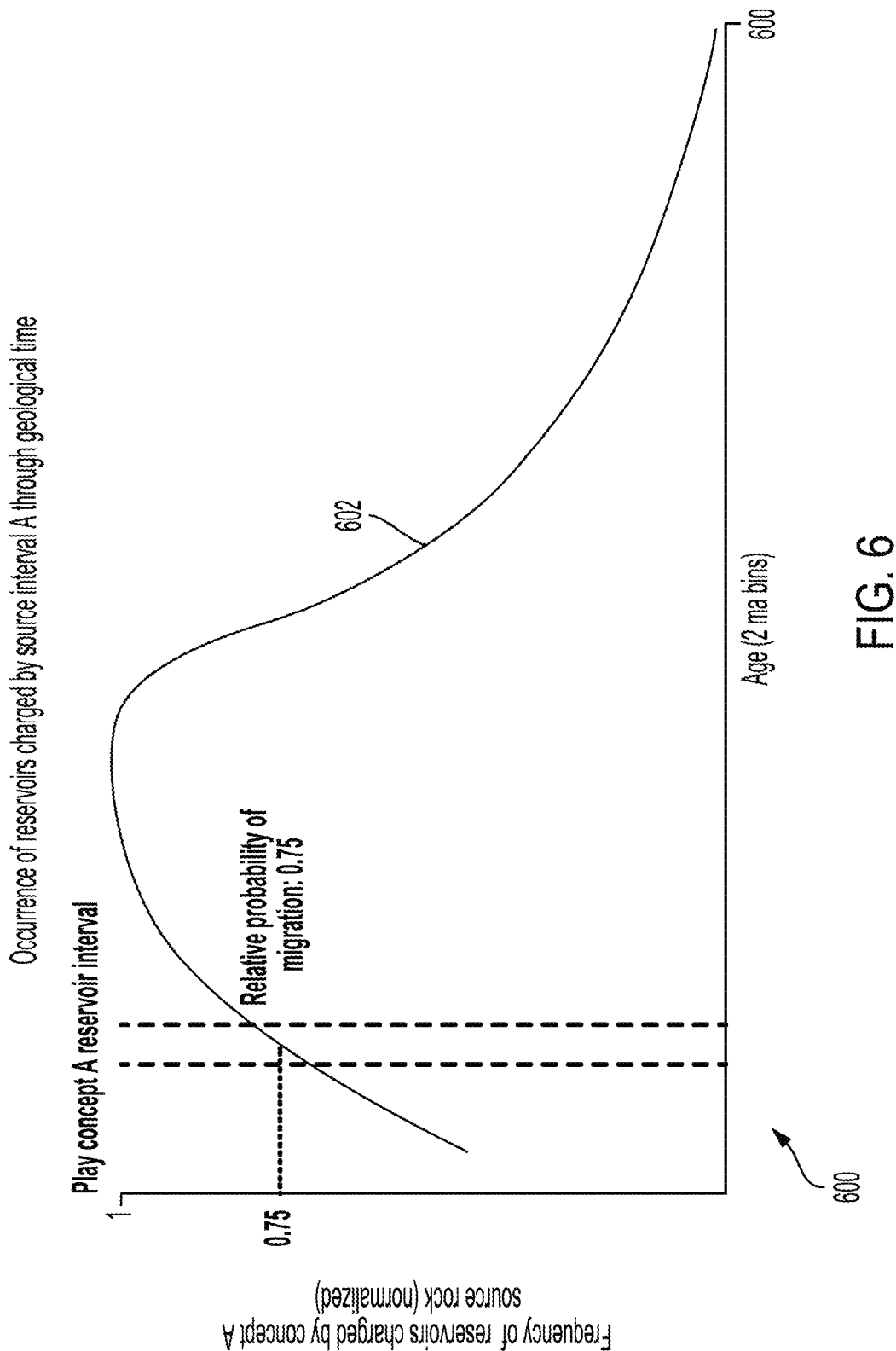
FIG. 6 is a graph showing a normalized proven reservoir probability distribution for a play concept subject to petroleum play analysis according to some aspects of the disclosure.
Figure 7:
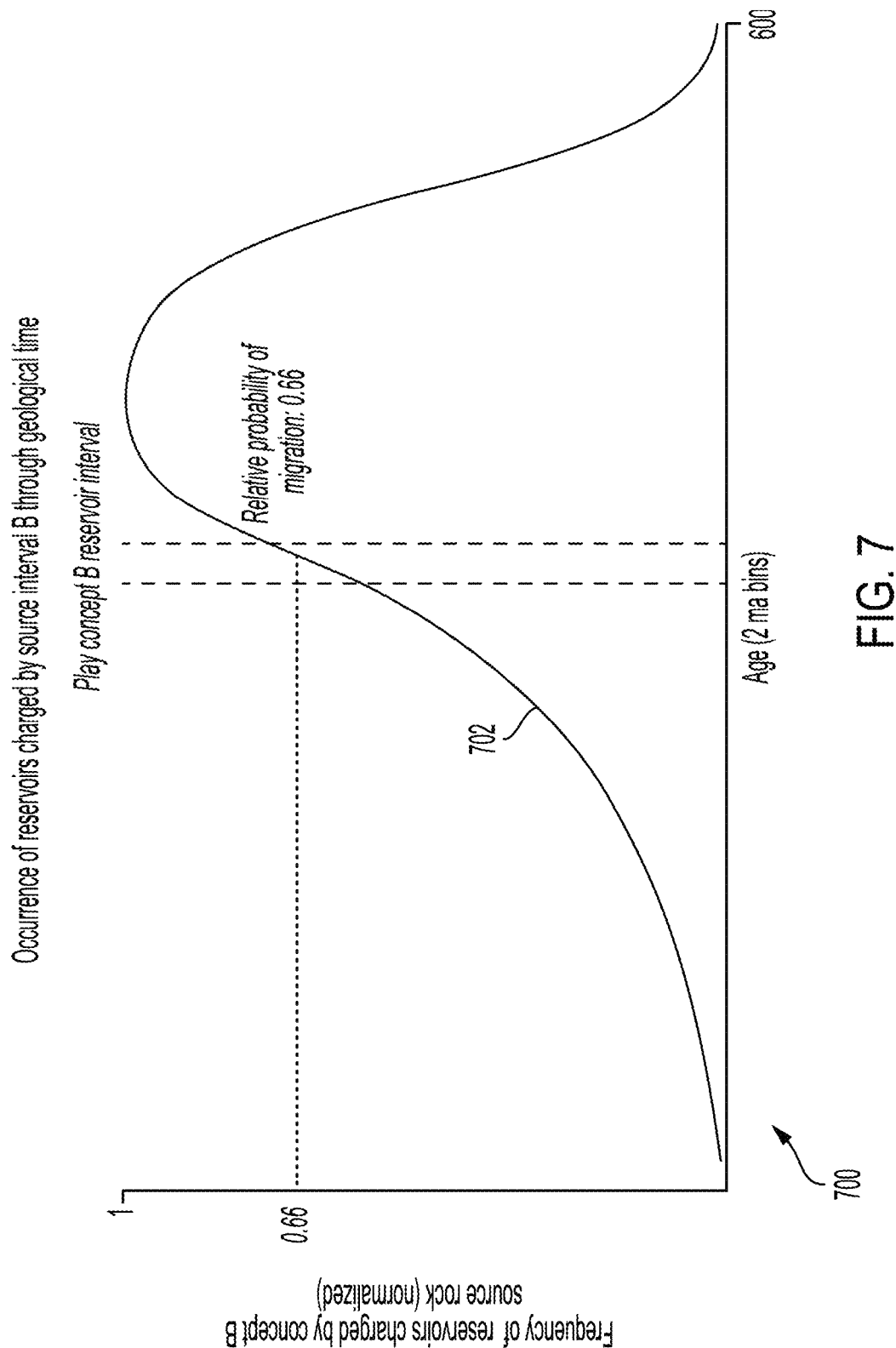
FIG. 7 is a graph showing a normalized proven reservoir probability distribution for another play concept subject to petroleum play analysis according to some aspects of the disclosure.

FIG. 6 depicts another graph 600 of data processed as part of petroleum play analysis according to some aspects of the disclosure. In FIG. 6, the normalized distribution 602 of proven reservoirs that are charged by a source rock of a particular age is shown. This population was derived from frequency data and was normalized in a similar manner to that described above with respect to FIG. 5. This relative chance of migration success is then combined with the relative probability for a source rock. FIG. 6 illustrates the relative chance of migration for play concept A. FIG. 7 depicts a similar graph 700 showing normalized distribution 702 and the relative chance of migration for play concept B.

Figure 8:
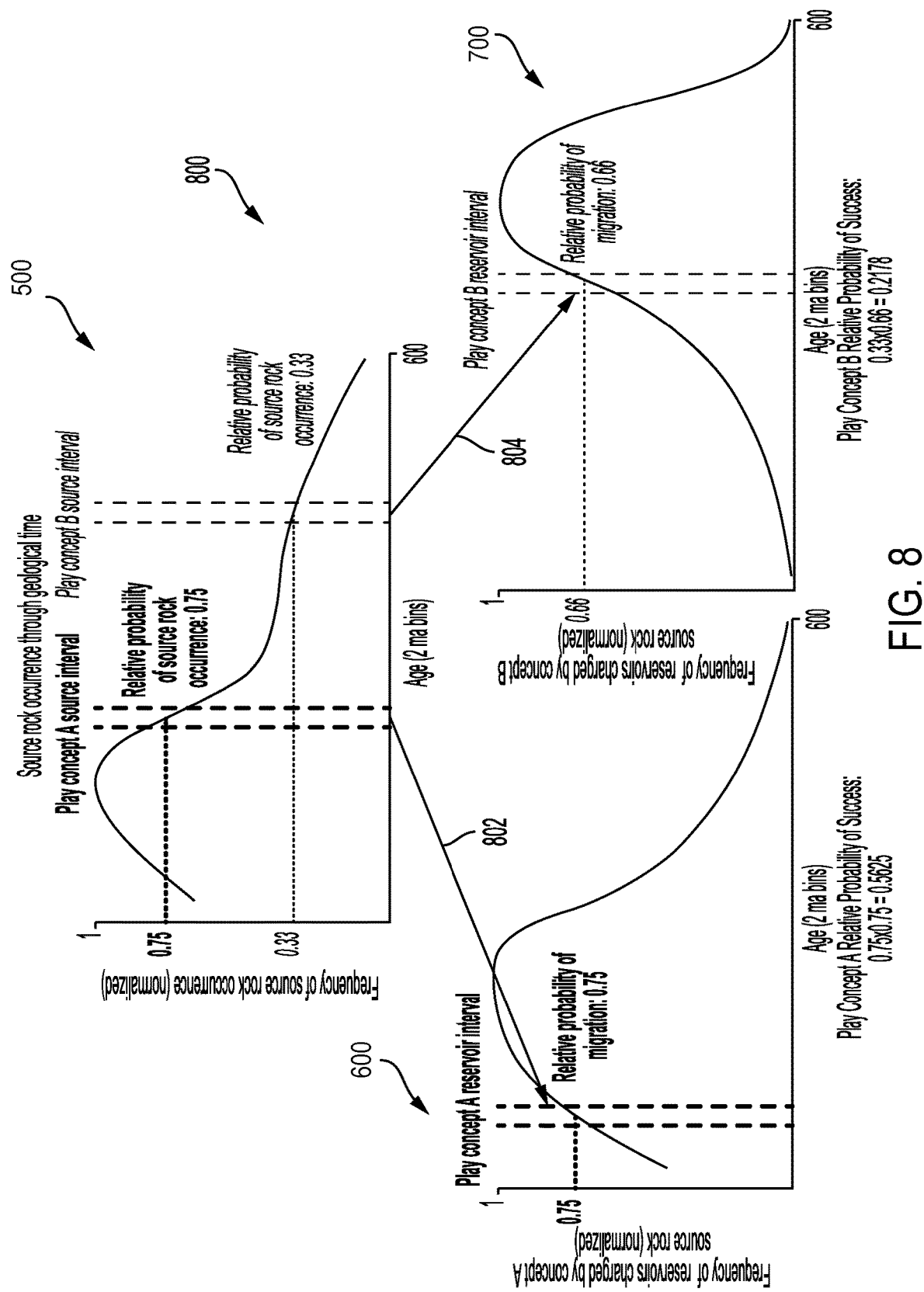
FIG. 8 is a collection of graphs illustrating the combination of probabilities distributions from FIG. 6 and FIG. 7 according to some aspects of the present disclosure.

The two probabilities for each play, the probabilities from FIG. 5 and the one for each play shown in FIG. 6 and FIG. 7 are combined by multiplying the probabilities as shown in FIG. 8. Combining the two probabilities for each proposed petroleum play produces a systematically defined probability of success for each proposed play concept. FIG. 8 depicts a collection 800 of graphs from the previous figures being superimposed. FIG. 8 shows the petroleum play A probability from graph 500 combined with the petroleum play A probability from graph 600 as indicated schematically by arrow 802. Collection 800 also shows the petroleum play B probability from graph 500 combined with the petroleum play B probability from graph 700 as indicated schematically by arrow 804. The probability of wellbore success for the proposed play concept A is 0.5625 and the probability of wellbore success for the proposed play concept B is 0.2178. The process described above can be systematically applied to a stored inventory of proposed play concepts in order to define a global schema for ranking play concepts. Proposed play concepts can be ranked according to probability or additional factors and displayed according to rank on display device 326.

In some examples, the empirical database includes whether petroleum traps exist in formations and whether a trap is stratigraphic or structural. A petroleum trap is an underground rock formation that blocks the movement of petroleum, causing it to accumulate in a reservoir. The accumulation of petroleum can be exploited to increase production. The probability of petroleum entrapment in a proposed petroleum play concept can thus be calculated in a manner similar to that described above, and the entrapment probability can be displayed along with the probability of success without entrapment. Alternatively, the entrapment probability can be included in the overall probability of success by including another probability term in the calculation.

Figure 9:
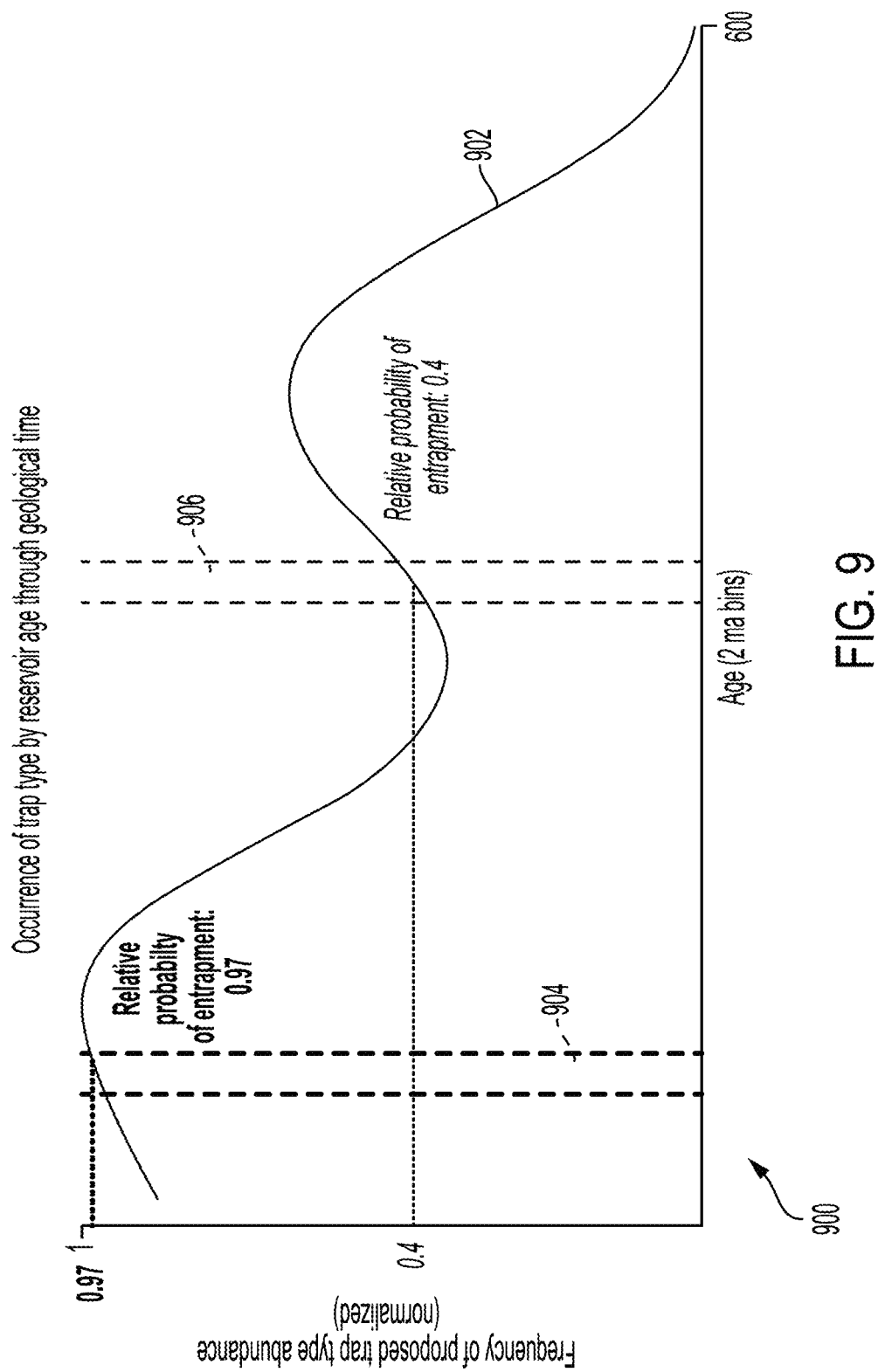
FIG. 9 is a graph illustrating a normalized entrapment curve according to some aspects of the disclosure.

FIG. 9 depicts another graph 900 that has been produced for petroleum trapping. Graph 900 shows a normalized entrapment curve 902. The entrapment curve intersects play 904 and play 906. The relative probabilities of entrapment of these two plays are 0.97 and 0.4, respectively.

In the examples above, geological ages of the proposed rock sources are compared with those of proven rock sources based on individual sources and individual reservoirs based on counts or proven play. As an alternative to a statistical process that considers discrete counts of proven plays, the volume of proven resources attributable to each of the source rock and reservoir intervals can also be used to quantify relative probabilities through time. In such a case, for example, geological age intervals for proposed rock sources are compared with those of proven rock sources based on attributable hydrocarbon volumes over time.

Figure 10:
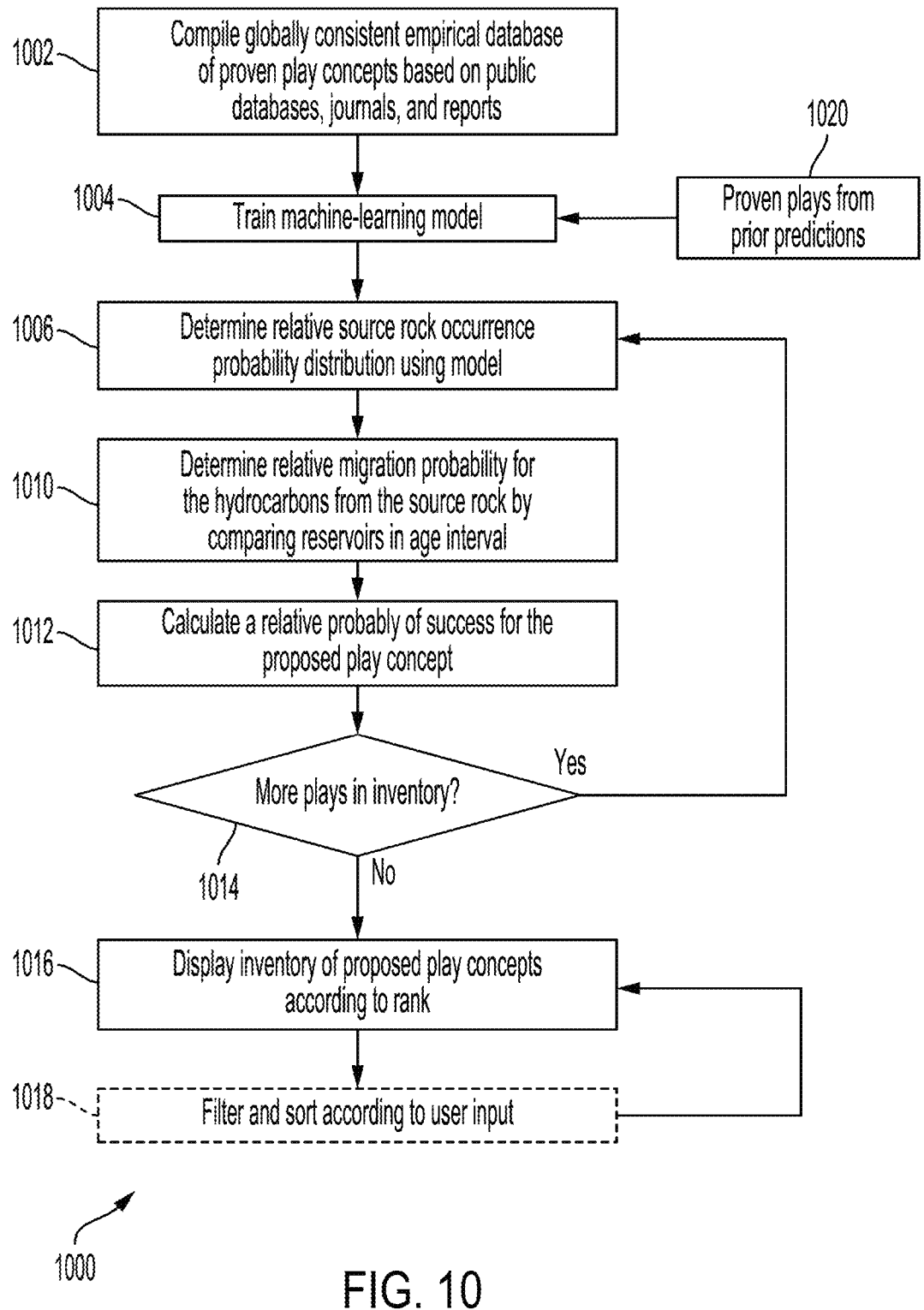
FIG. 10 is a flowchart illustrating a process for play analysis according to some aspects of the disclosure.

FIG. 10 is a flowchart illustrating a process 1000 for determining production probabilities of unproven hydrocarbon plays over time and for displaying an inventory of proposed plays with relative probabilities. At block 1002, the globally consistent, interactive, empirical database of proven play concepts is compiled. This database uses information available from public geological databases, journals, and publicly available geoscience reports. Information is compiled and stored as interactive empirical database 212. At block 1004, machine-learning model 322 is trained using information from, the database. The trained machine-learning model is stored in memory device 308. At block 1006, processing device 302 determines a probability distribution of relative source rock occurrences in proven play concepts using machine-learning model 322. At block 1010, processing device 302 determines the relative migration probability for hydrocarbons from the source rock by comparing reservoirs in various age intervals from the model to those in the proposed play concept. The operations of these blocks are similar to those described with respect to FIG. 4, except that processing device 302 does not directly access the database to make determinations, but rather, uses the database indirectly by accessing the machine-learning model of proven plays. At block 1012, the relative probability of success for a proposed play concept is calculated by processing device 302.

The reservoir comparison of block 1010 can be accomplished using a mathematically binned histogram for the age of source rocks from geographically distinct proven provinces to derive a relative probability that unproven source rocks could contribute to an unproven hydrocarbon system. Calculations are carried out based on an assumption that the interactive empirical database of plays is a globally representative sample. Using the same database, the age range of proven reservoirs that are charged from the proven source rocks of a particular age is assessed by binning histograms to computationally bin ages of proven rock sources. These histograms can be heterogeneous. The histograms show the likelihood of a charge migrating to reservoirs that are significantly younger or significantly older than the source rock. These two relative probabilities are combined to provide a model for the probability that a play concept will be successful as determined at block 1012.

At block 1014 of process 1000, the above-described operations of calculating the probability of success repeats as long as there are additional proposed play concepts left in the inventory to be displayed. Once a probability has been determined for all of the plays in the inventory, the inventory is displayed and ranked at block 1016 according to probability of success or by other criteria as indicated by user input. At block 1018, a user can input criteria to filter and sort the display of proposed plays. The proposed plays are displayed using assigned names or other recognizable designations and shown with their probability of success, probability of entrapment, both, or a combination of the two. Other data can be shown as well.

Over time, as proposed play concepts are proven by exploration or production, these proven play concepts 1020 can be used to retrain the machine learning model at block 1004 based on successes, failures, or both. The machine-learning model can also be retrained when the interactive empirical database is updated from public data over time as new data points are added to public geological databases and new information becomes available.

In some aspects, a system for hydrocarbon play analysis is provided according to one or more of the following examples. As used below, any reference to a series of examples is to be understood as a reference to each of those examples disjunctively (e.g., "Examples 1-4" is to be understood as "Examples 1, 2, 3, or 4").

Example 1. A computing device includes a processing device and a non-transitory memory device. The non-transitory memory device includes instructions that are executable by the processing device to cause the processing device to perform operations. The operations include determining a probability of source rock occurrence according to source rock age in a proven hydrocarbon play concept using an empirical database of proven hydrocarbon play concepts, determining a relative probability of migration for hydrocarbons from a source rock in an age interval of a proposed hydrocarbon play concept to a reservoir by comparing a normalized age distribution of proven reservoirs from the empirical database to proposed reservoirs in the age interval of the proposed hydrocarbon play concept, calculating a relative probability that the proposed hydrocarbon play concept corresponds to a successful hydrocarbon system by combining the probability of source rock occurrence and the relative probability of migration, and displaying the relative probability that the proposed hydrocarbon play concept corresponds to a successful hydrocarbon system.

Example 2. The computing device of example 1, wherein the operations further include determining an entrapment probability for the proposed hydrocarbon play concept using the empirical database of proven hydrocarbon play concepts, and displaying the entrapment probability with the relative probability that the proposed hydrocarbon play concept corresponds to a successful hydrocarbon system.

Example 3. The computing device of example(s) 1-2, wherein the operations further include computationally binning ages of proven rock sources from the proven hydrocarbon play concept to compare the normalized age distribution of proven reservoirs to the proposed reservoirs in the age interval of the proposed hydrocarbon play concept.

Example 4. The computing device of example(s) 1-3, wherein the operations further include calculating the relative probability for additional proposed play concepts from a stored inventory of proposed play concepts that includes the proposed play concept; ranking the stored inventory of proposed play concepts based on the relative probability; and displaying the stored inventory of proposed play concepts according to rank.

Example 5. The computing device of example(s) 1-4, wherein the empirical database includes information from unstructured files describing the proven hydrocarbon play concepts.

Example 6. The computing device of example(s) 1-5, wherein the probability of source rock occurrence and the normalized age distribution of proven reservoirs are based on counts of proven plays.

Example 7. The computing device of example(s) 1-6, wherein the probability of source rock occurrence and the normalized age distribution of proven reservoirs are based on hydrocarbon volumes.

Example 8. A method includes determining, by a processing device, a probability of source rock occurrence according to source rock age in a proven hydrocarbon play concept using an empirical database of proven hydrocarbon play concepts, determining, by the processing device, a relative probability of migration for hydrocarbons from a source rock in an age interval of a proposed hydrocarbon play concept to a reservoir by comparing a normalized age distribution of proven reservoirs from the empirical database to proposed reservoirs in the age interval of the proposed hydrocarbon play concept, calculating, by the processing device, a relative probability that the proposed hydrocarbon play concept corresponds to a successful hydrocarbon system by combining the probability of source rock occurrence and the relative probability of migration, and displaying, by the processing device, the relative probability that the proposed hydrocarbon play concept corresponds to a successful hydrocarbon system.

Example 9. The method of example 8 further includes determining an entrapment probability for the proposed hydrocarbon play concept using the empirical database of proven hydrocarbon play concepts, and displaying the entrapment probability with the relative probability that the proposed hydrocarbon play concept corresponds to a successful hydrocarbon system.

Example 10. The method of example(s) 8-9 further includes computationally binning ages of proven rock sources from the proven hydrocarbon play concept to compare the normalized age distribution of proven reservoirs to the proposed reservoirs in the age interval of the proposed hydrocarbon play concept.

Example 11. The method of example(s) 8-10 further includes calculating the relative probability for additional proposed play concepts from a stored inventory of proposed play concepts that includes the proposed play concept, ranking the stored inventory of proposed play concepts based on the relative probability, and displaying the stored inventory of proposed play concepts according to rank.

Example 12. The method of example(s) 8-11, wherein the empirical database includes information from unstructured files describing the proven hydrocarbon play concepts.

Example 13. The method of example(s) 8-12, wherein the probability of source rock occurrence and the normalized age distribution of proven reservoirs are based on counts of proven plays.

Example 14. The method of example(s) 8-13, wherein the probability of source rock occurrence and the normalized age distribution of proven reservoirs are based on hydrocarbon volumes.

Example 15. A non-transitory computer-readable medium includes instructions that are executable by a processing device for causing the processing device to perform operations to display hydrocarbon play analysis information. The operations include determining a probability of source rock occurrence according to source rock age in a proven hydrocarbon play concept using an empirical database of proven hydrocarbon play concepts, determining a relative probability of migration for hydrocarbons from a source rock in an age interval of a proposed hydrocarbon play concept to a reservoir by comparing a normalized age distribution of proven reservoirs from the empirical database to proposed reservoirs in the age interval of the proposed hydrocarbon play concept, calculating a relative probability that the proposed hydrocarbon play concept corresponds to a successful hydrocarbon system by combining the probability of source rock occurrence and the relative probability of migration, and displaying the relative probability that the proposed hydrocarbon play concept corresponds to a successful hydrocarbon system.

Example 16. The non-transitory computer-readable medium of example 15, wherein the operations further include determining an entrapment probability for the proposed hydrocarbon play concept using the empirical database of proven hydrocarbon play concepts, and displaying the entrapment probability with the relative probability that the proposed hydrocarbon play concept corresponds to a successful hydrocarbon system.

Example 17. The non-transitory computer-readable medium of example(s) 15-16, wherein the operations further include computationally binning ages of proven rock sources from the proven hydrocarbon play concept to compare the normalized age distribution of proven reservoirs to the proposed reservoirs in the age interval of the proposed hydrocarbon play concept.

Example 18. The non-transitory computer-readable medium of example(s) 15-17, wherein the operations further include calculating the relative probability for additional proposed play concepts from a stored inventory of proposed play concepts that includes the proposed play concept, ranking the stored inventory of proposed play concepts based on the relative probability, and displaying the stored inventory of proposed play concepts according to rank.

Example 19. The non-transitory computer-readable medium of example(s) 15-18, wherein the empirical database includes information from unstructured files describing the proven hydrocarbon play concepts.

Example 20. The non-transitory computer-readable medium of example(s) 15-19, wherein the probability of source rock occurrence and the normalized age distribution of proven reservoirs are based on at least one counts of proven plays or hydrocarbon volumes.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A computing device comprising:
a processing device; and
a non-transitory memory device comprising instructions that are executable by the processing device to cause the processing device to perform operations comprising:
determining a first probability of source rock occurrence according to source rock age in a proven hydrocarbon play concept using an empirical database of proven hydrocarbon play concepts;
determining a second probability of migration for hydrocarbons from a source rock in an age interval of a proposed hydrocarbon play concept to a reservoir by comparing a normalized age distribution of proven reservoirs from the empirical database to proposed reservoirs in the age interval of the proposed hydrocarbon play concept;
calculating a third probability that the proposed hydrocarbon play concept corresponds to a successful hydrocarbon system by combining the first probability of source rock occurrence and the second probability of migration;
displaying the third probability that the proposed hydrocarbon play concept corresponds to a successful hydrocarbon system; and
proving the proposed hydrocarbon play concept by exploration or production.

2. The computing device of claim 1, wherein the operations further comprise:
   determining an entrapment probability for the proposed hydrocarbon play concept using the empirical database of proven hydrocarbon play concepts; and
   displaying the entrapment probability with the third probability that the proposed hydrocarbon play concept corresponds to a successful hydrocarbon system.

3. The computing device of claim 1, wherein the operations further comprise computationally binning ages of proven rock sources from the proven hydrocarbon play concept to compare the normalized age distribution of proven reservoirs to the proposed reservoirs in the age interval of the proposed hydrocarbon play concept.

4. The computing device of claim 1, wherein the operations further comprise:
   calculating additional probabilities for additional proposed play concepts from a stored inventory of proposed play concepts that includes the proposed play concept;
   ranking the stored inventory of proposed play concepts based on the additional probabilities; and
   displaying the stored inventory of proposed play concepts according to rank.

5. The computing device of claim 4, wherein the empirical database includes information from a plurality of unstructured files describing the proven hydrocarbon play concepts.

6. The computing device of claim 1, wherein the first probability of source rock occurrence and the normalized age distribution of proven reservoirs are based on counts of proven plays.

7. The computing device of claim 1, wherein the first probability of source rock occurrence and the normalized age distribution of proven reservoirs are based on hydrocarbon volumes.

8. A method comprising:
   determining, by a processing device, a first probability of source rock occurrence according to source rock age in a proven hydrocarbon play concept using an empirical database of proven hydrocarbon play concepts;
   determining, by the processing device, a second probability of migration for hydrocarbons from a source rock in an age interval of a proposed hydrocarbon play concept to a reservoir by comparing a normalized age distribution of proven reservoirs from the empirical database to proposed reservoirs in the age interval of the proposed hydrocarbon play concept;
   calculating, by the processing device, a third probability that the proposed hydrocarbon play concept corresponds to a successful hydrocarbon system by combining the first probability of source rock occurrence and the second probability of migration;
   displaying, by the processing device, the third probability that the proposed hydrocarbon play concept corresponds to a successful hydrocarbon system; and
   proving the proposed hydrocarbon play concept based on exploration or production.

9. The method of claim 8, further comprising:
   determining an entrapment probability for the proposed hydrocarbon play concept using the empirical database of proven hydrocarbon play concepts; and
   displaying the entrapment probability with the third probability that the proposed hydrocarbon play concept corresponds to a successful hydrocarbon system.

10. The method of claim 8, further comprising computationally binning ages of proven rock sources from the proven hydrocarbon play concept to compare the normalized age distribution of proven reservoirs to the proposed reservoirs in the age interval of the proposed hydrocarbon play concept.

11. The method of claim 8, further comprising:
    calculating additional probabilities for additional proposed play concepts from a stored inventory of proposed play concepts that includes the proposed play concept
    ranking the stored inventory of proposed play concepts based on the additional probabilities; and
    displaying the stored inventory of proposed play concepts according to rank.

12. The method of claim 11, wherein the empirical database includes information from a plurality of unstructured files describing the proven hydrocarbon play concepts.

13. The method of claim 8, wherein the first probability of source rock occurrence and the normalized age distribution of proven reservoirs are based on counts of proven plays.

14. The method of claim 8, wherein the first probability of source rock occurrence and the normalized age distribution of proven reservoirs are based on hydrocarbon volumes.

15. A non-transitory computer-readable medium that includes instructions that are executable by a processing device for causing the processing device to perform operations to display hydrocarbon play analysis information, the operations comprising:
    determining a first probability of source rock occurrence according to source rock age in a proven hydrocarbon play concept using an empirical database of proven hydrocarbon play concepts;
    determining a second probability of migration for hydrocarbons from a source rock in an age interval of a proposed hydrocarbon play concept to a reservoir by comparing a normalized age distribution of proven reservoirs from the empirical database to proposed reservoirs in the age interval of the proposed hydrocarbon play concept;
    calculating a third probability that the proposed hydrocarbon play concept corresponds to a successful hydrocarbon system by combining the first probability of source rock occurrence and the second probability of migration;
    displaying the third probability that the proposed hydrocarbon play concept corresponds to a successful hydrocarbon system; and
    proving the proposed hydrocarbon play concept by exploration or production.

16. The non-transitory computer-readable medium of claim 15, wherein the operations further comprise:
    determining an entrapment probability for the proposed hydrocarbon play concept using the empirical database of proven hydrocarbon play concepts; and
    displaying the entrapment probability with the third probability that the proposed hydrocarbon play concept corresponds to a successful hydrocarbon system.

17. The non-transitory computer-readable medium of claim 15, wherein the operations further comprise computationally binning ages of proven rock sources from the proven hydrocarbon play concept to compare the normalized age distribution of proven reservoirs to the proposed reservoirs in the age interval of the proposed hydrocarbon play concept.

18. The non-transitory computer-readable medium of claim 15, wherein the operations further comprise:
- calculating additional probabilities for additional proposed play concepts from a stored inventory of proposed play concepts that includes the proposed play concept;
- ranking the stored inventory of proposed play concepts based on the additional probabilities; and
- displaying the stored inventory of proposed play concepts according to rank.

19. The non-transitory computer-readable medium of claim 18, wherein the empirical database includes information from a plurality of unstructured files describing the proven hydrocarbon play concepts.

20. The non-transitory computer-readable medium of claim 15, wherein the first probability of source rock occurrence and the normalized age distribution of proven reservoirs are based on at least one of counts of proven plays or hydrocarbon volumes.

* * * * *